March 11, 1941.  F. B. MacLAREN, JR  2,234,184
ELECTRONIC CONTROL SYSTEM
Filed June 14, 1938      2 Sheets-Sheet 1

INVENTOR.
FRED B. MacLAREN JR.
BY
ATTORNEY.

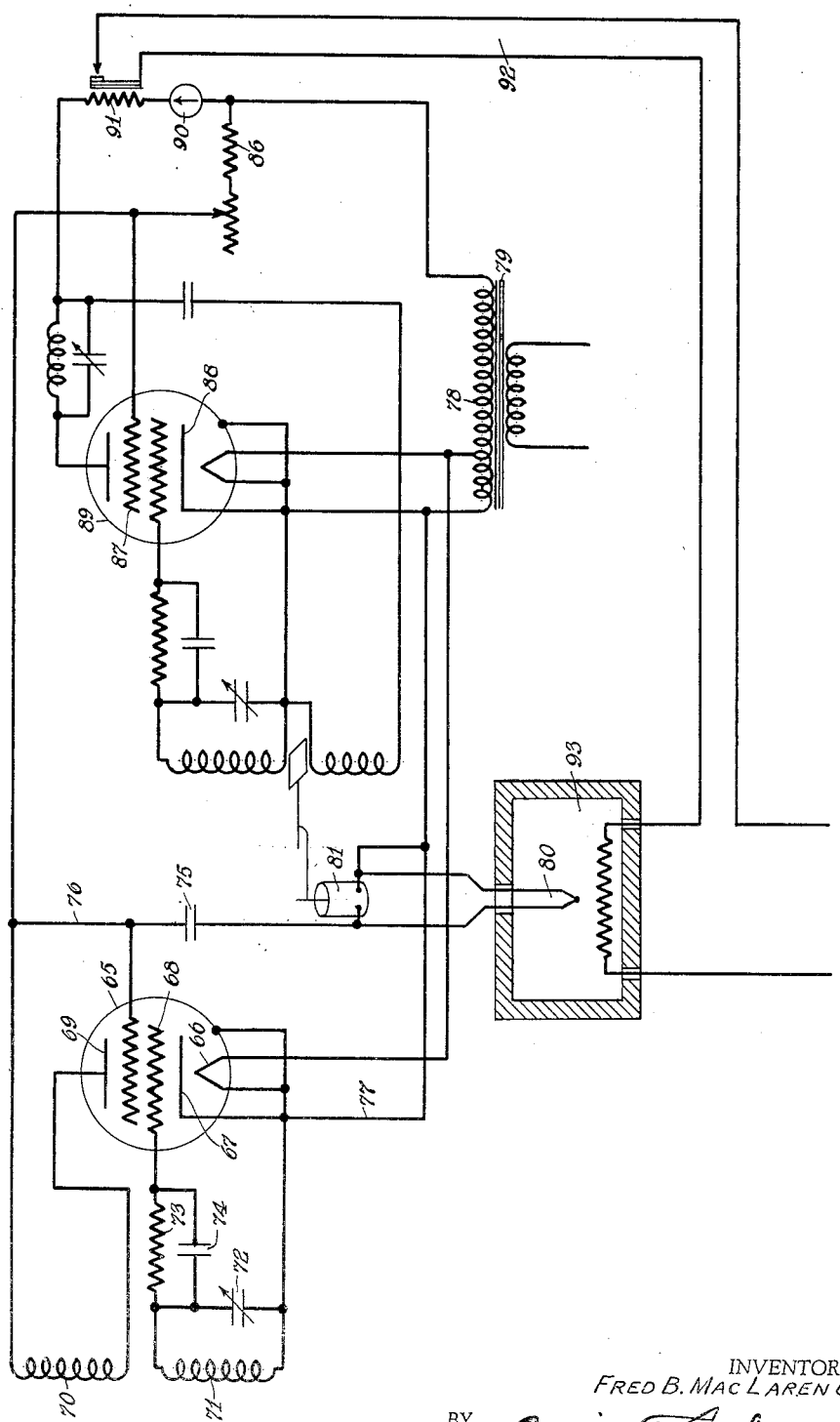

Patented Mar. 11, 1941

2,234,184

UNITED STATES PATENT OFFICE 2,234,184

ELECTRONIC CONTROL SYSTEM

Fred B. MacLaren, Jr., Waterbury, Conn., assignor to The Bristol Company, Waterbury, Conn., a corporation of Connecticut Application June 14, 1938, Serial No. 213,621

17 Claims. (Cl. 250—36)

This invention relates to electrical control systems, and more especially to a control system including electronic means and a movable member subject to very weak directive forces, the movement of said member being caused to react upon oscillating circuits comprising the electronic means to command the control of appreciable amounts of energy which may be utilized to affect a variable condition of whose value the magnitude of said weak forces may be made a measure.

An object of the invention is to provide an electronic control system continuously responsive to the variable condition under control and in a manner such that no mechanical engagement of a pointer or like element subject to the said condition will be necessary.

The invention has for another object the provision of an electronic control system which is automatically protected against failure of the control circuit and devices; and also the provision of means to secure protection of the system against failure of the element responsive to the variable condition and without affecting the accuracy of the condition measuring system.

It is a further object of this invention to provide a control system of the nature specified, in which a pointer or the like, whose movements serve to govern the performance of the electronic system, shall not be subjected to unbalanced electrostatic or electromagnetic forces, which otherwise might cause it to assume a false position not truly representative of the magnitude to be measured and controlled.

In electronic practice, it is a common procedure to affect the oscillatory condition of a feedback circuit by varying the regenerative coupling between the input and output circuits. It is a well-known fact, however, that a metallic member, placed in the field of the feedback coils of an oscillator circuit, will have mechanical force exerted on it due to electromagnetic reaction with the high-frequency field. When said member, however, is directly associated with a delicate measuring instrument, said force, as related to the actuating forces of the instrument, may seriously disturb the accuracy of measurement.

In accordance with the invention hereinafter disclosed and claimed, control of the oscillatory condition of the oscillator circuit is accomplished by means of an additional coil in the output circuit, which coil is untuned and consequently carries less current of the oscillatory frequency. With this arrangement, while the force on the movable member will be decreased in proportion to the decrease in oscillation current in the coil adjacent the movable member, oscillation will occur equally well, and control of the oscillatory conditions may also be effected with equal ease.

The movable member may be actuated by the electromotive force of a thermocouple responsive to the condition under control; and provision is made to protect the control system against failure of such couple by associating therewith an additional oscillatory circuit influenced by such failure to operate a cut-out relay or to effect a suitable indication thereof, or both.

The nature of the invention, however, will best be understood when described in connection with the accompanying drawings, in which:

Fig. 4 is a diagrammatic representation of the novel control system equipped with means to safeguard the same against failure of the element sensitive to the variable condition.

Figure 1:
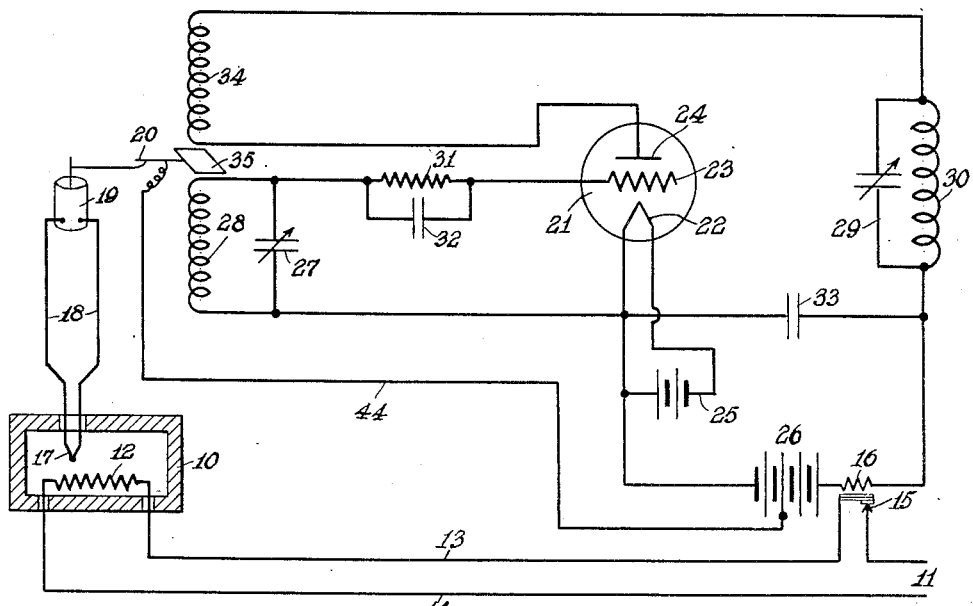
Fig. 1 is a diagrammatic representation of a control system embodying the invention.

Referring to Fig. 1 of the drawings 10 designates an electric or other furnace of conventional form, in which it is desired to maintain a constant predetermined temperature, for example, by means of the regulation of electric current derived from a source 11, and supplied to a heating element 12 through two line conductors 13 and 14. In series with the conductor 13 are the contacts of a critically adjusted relay 15, preferably of the thermal expansion type, having an actuating winding (heater coil) 16 and contacts adapted to complete the circuit between the heating element 12 and its source of supply 11 when the current in said actuating winding exceeds a predetermined critical value, and to interrupt said circuit when said current falls below said value.

Suitably positioned in the furnace 10 to be exposed to the heat thereof is a thermocouple 17, which is connected through a two-conductor circuit 18 to a sensitive galvanometer or millivoltmeter element 19 having a deflecting pointer 20 whereby the deflection of said pointer in response to electric current flowing in the winding of said galvanometer becomes a measure of the temperature within the furnace 10.

Response to the deflections of the galvanometer pointer 20 for control of the relay 15 is obtained by means of an oscillatory circuit system including an electron-discharge device such as the three-element thermionic tube 21 having a filament or cathode 22, a grid 23, and a plate or anode 24. The last is connected in a tuned-plate tuned-grid oscillator circuit, and there is provided a battery 25 for heating the filament and a battery 26 for supplying the plate potential. The input circuit includes an adjustable condenser 27, having in parallel therewith an inductive coil 28, as a means for tuning said circuit to an oscillating frequency; while the plate circuit includes an adjustable condenser 29, having in parallel therewith an inductance 30, as a means to cause resonance in the plate circuit at the same oscillatory frequency. In series with the battery 26 is connected the actuating winding 16 of the relay 15. In series with the grid circuit is connected a high value grid-leak resistance 31, having in parallel therewith a by-pass condenser 32; and by-passing the oscillatory component of plate current to the cathode circuit is a suitable condenser 33.

According to the well-known principles of oscillating circuits, such a system would normally oscillate due to electrostatic feedback between the output and input circuits within the tube. Provision is made, however, for inhibiting this action by means of a coil 34 which is included in series with the plate circuit and is located in mutual inductive relationship with the coil 28 of the grid circuit, and so connected relatively thereto as to cause degeneration and prevent oscillation in the system.

An electrically conducting vane 35, carried by the pointer 20 of the galvanometer 19, is arranged so as to move in the field between the coils 28 and 34, and in the course of its deflection to attain a position where its shielding action will decrease mutual inductance between these coils to the extent that the degenerative action between plate and grid circuits will be reduced and oscillation increased. By providing simultaneous adjustment of the coils 28 and 34 along the path of the vane 35, as hereinafter set forth, it is possible to select the point in the excursion of the pointer 20 at which shall take place the transition between oscillatory and non-oscillatory conditions in the system, and therefore the point in the instrument scale at which the desired control shall be effected.

When oscillation occurs in the system, a high frequency alternating voltage will make its appearance across the coil 28, making the grid alternatively positive and negative with respect to the cathode. When the grid is positive, the electron flow through the grid-leak resistance 31 will be in such a direction as to bias the grid negatively and produce a decrease in the plate current. While the condenser 32, by holding its charge over a half-cycle, will tend to maintain the bias on the grid, it will also serve to by-pass the pulsating component of the grid voltage, the corresponding pulsating component of the plate current being by-passed through the condenser 33. The non-pulsating, or unidirectional, component of the plate current will pass through the actuating winding of the relay 15, which is adjusted to give operation at a value of current lying between that corresponding to oscillatory and that corresponding to non-oscillatory conditions as the vane 35 passes the selected control point in its path of deflection.

Figure 2:
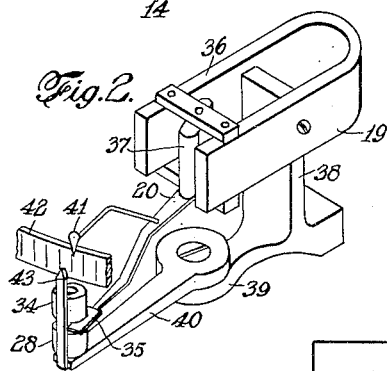
Fig. 2 is a perspective drawing of an element of the mechanism, showing certain features of the adjustment.

Means by which adjustment of the control point may be effected by positioning the coils 28 and 34 in relation to the path of the vane 35, is shown in Fig. 2. The galvanometer 19, including a permanent magnet 36 and a deflecting coil 37 pivotally mounted in the field thereof, is mounted upon a support 38. Carried by a bearing 39 coaxial with the galvanometer coil is an adjustably swingable bracket 40 upon which are permanently mounted the coils 28 and 34, having between them a space through which may pass the vane 35 carried by the pointer 20 of the galvanometer 19. An index 41 attached to the pointer 20 provides on a stationary graduated scale 42 a measure of the deflection of the galvanometer moving part, and an index 43 attached to the bracket 40 similarly provides on the same scale an indication of the adjusted position of the bracket and the coils 28 and 34 carried thereby. With circuit adjustments once made so that relay action takes place as the two indexes reach a position of coincidence on the scale, the setting of the index 43 in relation to the scale will provide a measure of the temperature, or other value to be regulated, at which control action will take place.

When the circuits are in a state of oscillation, the coils 28 and 34 will be carrying high-frequency currents, tending to induce eddy currents in the conducting vane 35, which eddy currents, reacting upon the fluxes which produce them, will set up magnetic reactions between the vane and the coils. However, since the oscillation current in the untuned coil 34 is relatively low in value, and the number of turns in that coil necessary to obtain degeneration is relatively small, the flux produced by coil 34 will be of such small value as to cause negligible force on the movable element. The current flowing in coil 28, even though it is tuned by condenser 27, is also small, being limited by the low value of grid current of the tube and by such resistance as the winding of the coil 28 may possess.

Since there normally exists a difference of electrical potential between the coils 28 and 34, and since mechanical relationships among parts (particularly if a metal enclosure is used for the circuits) is likely to produce a condition wherein there exists a certain amount of capacitance between the vane 35 and one side of the plate supply battery 26, there may normally be a resultant electrostatic force exerted on the vane, with a consequent error of measurement. Furthermore, since the electrostatic condition of the vane would normally be subject to influence of the neighboring currents in the coils 28 and 34, and would also depend upon the dielectric characteristics of such insulation as might be embodied in the means by which the vane is supported from the galvanometer pointer, it will be apparent that infinitesimal and uncontrollable variations in these elements of the mechanism could produce relatively great changes in the electrostatic state of the vane, and consequently upon such forces to which it may be submitted. In order to eliminate this condition, there is provided a conductor 44 electrically connecting the vane 35 to a point on the plate supply battery 26 having an electrical potential intermediate the potentials of the coils 28 and 34. Under this condition, the potential of the vane 35 is definitely stabilized; and, by proper selection of the point at which connection is made to the plate supply battery, there may be established a condition where the electrostatic forces on the vane are reduced to a negligible magnitude.

In the operation of the device, it may first be assumed that there exists a condition wherein the temperature to be controlled in the furnace 10 is below the pre-established control point, the relative disposition of parts and polarity arrangement being such that the vane 35, carried by the pointer 20, will lie without the common field of coils 28 and 34, so that the related circuits, as hereinabove set forth, will be in a non-oscillatory condition, and the plate current will have its maximum value. The unidirectional component of this current, passing through the winding of relay 15, will cause its contacts to be closed, energizing from the source 11 the heating element 12, and tending to increase the temperature within the furnace 10. Upon an increase in electromotive force developed by the thermocouple 17 due to rising temperature, the deflection of the galvanometer 19 will cause the vane 35 to be carried into the common field of the coils 28 and 34, shielding one from the other and allowing an oscillatory condition to develop in the associated circuits. A consequent reduction in the magnitude of the plate current results with release of the relay 15, thereby de-energizing the heating element 12. Thus, there is set up in the system an action which results in a tendency toward the establishment and maintenance of the temperature within the furnace 10 at a value determined by the setting of the coils 28 and 34 in relation to the path traversed by the pointer 20 of the galvanometer 19. It will further be obvious that, should there develop a failure of power in the oscillatory circuits, due either to faulty batteries, a defective tube, or an open circuit, the current in the winding 16 of the relay 15 will either be reduced to its minimum value or will entirely cease to flow, in either of which cases the contacts will be opened, the heating element 12 de-energized, and the system caused to revert to a safe condition.

Figure 3:
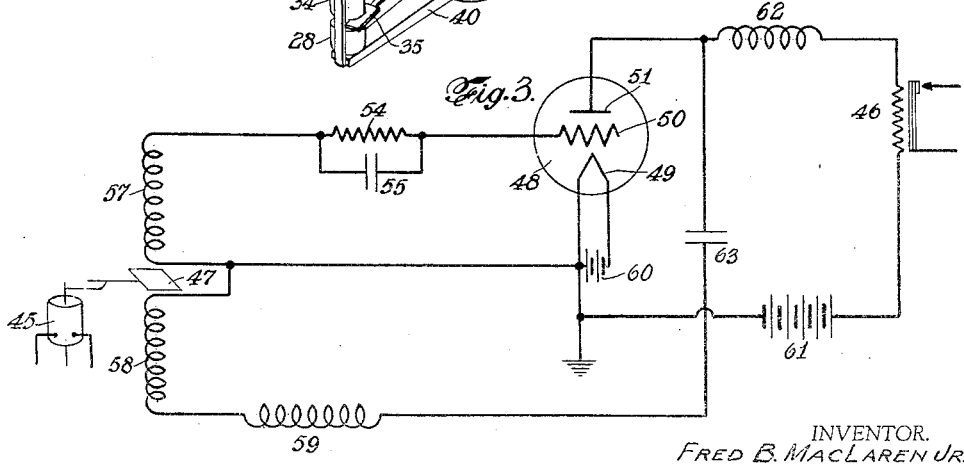
Fig. 3 is a diagrammatic representation of an alternative embodiment of the invention.

In Fig. 3 is represented an alternative control circuit having a performance essentially equivalent to that shown in Fig. 1, but involving certain features which to a degree differentiate it from that embodiment. Adapted for association with a furnace or the like to be placed under automatic regulation, and identical in all respects with that set forth in connection with Fig. 1, are a condition-responsive instrument 45, providing a measure of the controlled magnitude, and a relay 46 adapted to govern the supply of a controlling or condition-affecting agent. Response to the deflections of the instrument 46 is obtained through the association of a conducting vane 47 carried by the moving element with an oscillatory circuit system including an electron-discharge device such as the three-element thermionic tube 48, having a filament or cathode 49, a grid 50 and an anode 51, connected in a form of the well known Hartley oscillatory circuit utilizing the inter-electrode capacity of the thermionic tube. Connected from the cathode 49 to the grid 50, through a grid-leak resistance 54 paralleled by a condenser 55, is an inductive coil 57 which is positioned in mutually inductive relationship with a coil 58. A further inductance coil 59 is connected in the return circuit for the oscillatory component of output current, in series with coil 58 and a condenser 63.

A suitable power supply, as, for example, a battery 60, provides current for heating the cathode 49; and power for the anode circuit is derived from a suitable source as, for example, a battery 61 connected into said circuit in series with the actuating winding of relay 46 and a high-frequency inductance choke coil 62. Such a system would normally oscillate due to feedback between the coils 58 and 59 and coil 57 by means of the inter-electrode capacity between the input and output circuits of the tube 48 and the condenser 63 which completes the circuit for the oscillatory current.

Provision is made for inhibiting the oscillatory condition of the system by means of the inductive coil 58 so connected as to cause degeneration when its flux links coil 57, both coils being juxtaposed to the movable conducting vane 47, whereby movement of the latter relative to the common field of said coils will affect their mutual inductance. One terminal of the coil 58 is connected to the cathode 49 and to the coil 57, whereby adjacent parts of said coils are maintained at the same potential (preferably ground). The other terminal of the coil 58 is connected through the coil 59 and condenser 63 to the plate circuit. The relative polarity of the coils 57 and 58 is so selected that under conditions of maximum mutual inductance, as would exist when the vane 47 is not interposed between the coils, their interaction will be such as to cause degeneration and prevent oscillation, and when the vane is moved into the common field this interaction is inhibited and an oscillatory condition established.

Under conditions of oscillation, a high-frequency potential will appear across the terminals of coil 57, causing the grid 50 to become alternately positive and negative with respect to the cathode 49. During the time when the grid is positive with respect to the cathode, a stream of electrons will pass to the grid, to cause to flow in the resistance 54 a unidirectional current which will bias the grid negatively and will charge the condenser 55 so that the bias will be maintained over the negative half of the cycle during which no current flows. The negative bias of the grid 50 will cause a decrease in the plate current, and therefore in the current passing from the power source 61 through the relay 46. Thus, when the system is in a state of oscillation, the current in the relay will be at a minimum value; and, when oscillation is inhibited, the current in the relay will be at a maximum value. The relay is selectively adjusted between these values, so that its contacts will remain open with minimum current, and will close with maximum current flowing.

The oscillatory component of the plate current, being unable to flow through the choke 62, will be by-passed through the condenser 63 and the coils 58, 59 to the cathode 49; and it is the field of this current flowing in the coil 58 which, reacting upon the coil 57, opposes the flux of the latter coil and sets up the degenerative action tending to inhibit oscillation, except when the vane 47 is interposed between the coils.

When the circuits are in a state of oscillation the coils 57 and 58 will be carrying high-frequency currents which ordinarily would tend to induce in the conducting vane 47 eddy currents with consequent disturbing forces upon the vane. However, since in order to effect the required degenerative action, the current in both coils need be only of small magnitude, there is no appreciable disturbing force on the vane.

Again, as direct metallic connection serves to maintain the adjacent portions of the coils 57 and 58 at the same potential, and if desired at the same potential as any metallic casing in which the circuit may be enclosed, it is obvious that there can be no electrostatic forces exerted upon the vane 47. Thus, the vane is rendered substantially independent of all extraneous forces such as might otherwise tend to disturb the accuracy with which its position relative to the coils 57 and 58 is a measure of the condition under control.

The operation of the system is essentially similar to that of the embodiment shown in Fig. 1. With a demand for increased supply of the controlling agent, as represented by a condition where the vane 47 lies without the common field of coils 57 and 58, the system will be in a non-oscillatory condition, with current in the grid circuit at its minimum value, a corresponding minimum negative bias upon the grid, and a consequent maximum value of plate current, whose non-pulsating component passing through the actuating winding of relay 46 will cause its contacts to be closed, providing an increased supply of the condition affecting agent to meet the demand indicated by the position of the vane 47. Upon a cessation of demand for the condition affecting agent, as reflected in a movement of the vane 47 into the common field of the coils 57 and 58, the degenerative action due to their mutual inductance will be inhibited, and an oscillatory condition established, with a consequent reduction in the value of the plate current, releasing the relay 46 and terminating the increased supply of the condition-affecting agent.

It will be obvious that, as in the embodiment shown in Fig. 1, should either the tube 48 or the electric power supply be subject to failure, the current in the actuating winding of the relay 46 will fall to a value sufficiently low to release the relay and cause the system to revert to a safe condition. It will further be apparent to those versed in the art that for the battery systems indicated there may be substituted an alternating-current source of supply, such as a transformer supplied from commercial frequency, and that use may be made of tubes having indirectly heated cathodes, or that the circuit may be modified to utilize a vacuum tube of the screen-grid type, with its well known advantages, without departing from the spirit of the invention.

Such alternating current source of supply is indicated in Fig. 4 which sets forth also an associated protective circuit for the element responsive to the variable condition. As shown, the protective circuit comprises an electron discharge device 65, having a heated filament 66, a source of electrons or cathode 67, a grid or control element 68, and a plate or anode 69, a coil 70 being connected in series with the output circuit of the discharge device. The latter is in mutually inductive relationship with a coil 71, tuned by variable condenser 72, connected in the input circuit. A grid leak resistance 73, having a condenser 74 in parallel with it, is connected in series with the said grid. A further condenser 75 is connected between cathode 67 and the coil 70 to provide a complete circuit for the oscillating component of the plate current. Power for the protective and control circuit is obtained from source of potential 78 as the secondary of a transformer 79.

This protective circuit is connected by leads 76 and 77 across the thermocouple 80 and millivoltmeter 81 of the control circuit, and the armature of the millivoltmeter affords a radio frequency choke coil which is connected in series with the condenser 75 and cathode 67. Condenser 75 being connected from the plate coil 70 to the cathode 67 as shown, it will provide a by-pass for currents of oscillation frequency, which are caused by feedback between output and input circuits by means of coils 70 and 71. The choke coil afforded by instrument 81 offers a very high impedance to the high frequency pulsating component of plate current, so that substantially all of the said high frequency current flows through condenser 75 and said thermocouple 80.

If any failure should occur in the thermocouple circuit, the high frequency current would have to pass through the millivoltmeter element, which acts as a radio frequency choke, offering to said current such a high impedance as to inhibit oscillation in the plate circuit. Due to the action of the grid leak 73 and condenser 74, the non-pulsating component of the plate current will rise when oscillation ceases, increasing the voltage drop across a resistor 86 and lowering the voltage between the screen 87 and cathode 88 of the electron discharge device 89 of the control circuit. This circuit is similar in operation to that shown in Fig. 3 of the drawings. Due to the characteristics of the discharge device 89, the lowering of the voltage applied to screen 87 of this device will cause a decrease in its output current. The change of current then can be used to indicate thermocouple failure as at the indicating instrument 90, and to affect a relay 91 to turn off heating means to which thermocouple 80 is exposed, as by opening the power circuit 92 to the furnace 93 in which is located thermocouple 80. By eliminating the said oscillatory control circuit entirely, the drop across the resistance may directly be caused to affect a relay or other device.

It will be obvious, also, to those skilled in the art, that any form of oscillatory circuit may be used and any part of the circuit through which only oscillatory current flows may be incorporated with the thermocouple circuit to provide a safety feature circuit of the nature specified, without affecting the reading of the millivoltmeter when it is acting as a temperature indicator.

I claim:

1. In a system for control of a variable condition to a predetermined value, and including means subject to the condition under control, and an electrically conducting and movable member deflectable by said means: the combination with an electron discharge device provided with an output circuit and with an oscillation circuit including two mutually inductive portions associated in a sense to degenerate oscillatory action in said oscillation circuit and affording a common field therebetween, said movable member being deflectable therein for inhibiting the degenerative action of said mutually inductive portions, thereby varying the oscillatory condition of said oscillation circuit; and an associated electronic protective circuit the flow of current in which is influenced by failure of said means subject to the condition under control.

2. In a system for control of a variable condition to a predetermined value, and including means subject to the condition under control, and an electrically conducting and movable member deflectable by said means: the combination with an electron discharge device provided with an output circuit and with an oscillation circuit including two mutually inductive portions associated in a sense to degenerate oscillatory action in said oscillation circuit and affording a common field therebetween, said movable member being deflectable therein for inhibiting the degenerative action of said mutually inductive portions, thereby varying the oscillatory condition of said oscillation circuit; and a protective circuit having an electron discharge device, said protective circuit including in series the means subject to the condition under control, and means associated with the said first-named electron discharge device subject to the current of the protective circuit to vary space current thereof.

3. In a system for control of a variable condition to a predetermined value, and including a measuring circuit embodying a temperature-responsive element subject to the condition under control and an inductive measuring instrument electrically connected therewith for actuation thereby and having an electrically conductive movable member deflectable by said measuring instrument: the combination with an electron discharge device provided with an output circuit and with an oscillation circuit including two mutually inductive portions associated in a sense to degenerate oscillatory action in said oscillation circuit and affording a common field therebetween, said movable member being deflectable therein for inhibiting the degenerative action of said mutually inductive portions, thereby varying the oscillatory condition of said oscillation circuit; and a protective circuit having an electron discharge device with input and output circuits and means for securing feedback between the said input and output circuits to produce an oscillatory current therein and one of which circuits includes the measuring circuit whereby under normal conditions only the temperature-responsive element passes the oscillatory current, and a biasing means connected in the output of the protective circuit and to the first-named electron discharge device to affect the space current of the latter.

4. In a system for controlling a variable condition: an electrical measuring circuit including a substantially non-inductive portion embodying means responsive to the condition under control and generating in said circuit a unidirectional current representative of the magnitutde of said condition, and an inductive portion responsive to the unidirectional current; and controlling means whereby said condition may be made subject to the value of said unidirectional current, together with a protective circuit including a source of alternating current and connected to said measuring circuit, and means responsive to a change in the alternating current upon its interruption in the said non-inductive portion.

5. In a system for controlling a variable condition: an electrical measuring circuit including a substantially non-inductive portion embodying means responsive to the condition under control and generating in said circuit a unidirectional current representative of the magnitude of said condition, and an inductive portion responsive to the unidirectional current; and controlling means whereby said condition may be made subject to the value of said unidirectional current, together with a protective circuit including a source of alternating current and connected to said measuring circuit and adapted upon interruption of the non-inductive portion of the same to superimpose upon said controlling means an effect due to a change in said alternating current consequent upon said interruption whereby to affect the control of the condition.

6. In a system for controlling a variable condition: an electrical measuring circuit including a substantially non-inductive portion embodying means responsive to the condition under control and generating in said circuit a unidirectional current representative of the magnitude of said condition, and an inductive portion responsive to said unidirectional current; and controlling means whereby said condition may be made subject to the value of said unidirectional current, together with a protective circuit including means adapted to generate high-frequency current therein, said protective circuit including said measuring circuit, and adapted upon interruption of the non-inductive portion of said measuring circuit to superimpose upon said controlling means an effect due to a change in said high-frequency current consequent upon said interruption whereby to affect the control of the condition.

7. In a system for controlling a variable condition to a predetermined value, and including a measuring circuit embodying means responsive to the condition under control and an inductive measuring instrument electrically connected therewith for actuation thereby: a protective circuit including an electron discharge device with input and output circuits and means for securing feedback between the input and output circuits to produce an oscillatory current in the latter circuit which includes the said measuring circuit with responsive means and measuring instrument whereby under normal conditions only the responsive means subject to the variable condition passes the said oscillatory current of the circuit, the inductive measuring instrument affording sufficiently high impedance to prevent substantially the passage of said oscillatory current when the flow thereof in the said measuring circuit is interrupted.

8. In a system for control of a variable condition to a predetermined value, and including means subject to the condition under control, an electrically conducting and movable member deflectable by said means, and an electron discharge device provided with an oscillation circuit and with an output circuit: two mutually inductive portions connected in said oscillation circuit and associated in a sense to degenerate oscillation therein, said movable member being deflectable in the field between said mutually inductive portions for inhibiting the degenerative action therebetween to vary thereby the oscillatory condition of said oscillation circuit.

9. In a system for control of a variable condition to a predetermined value, and including means subject to the condition under control, an electrically conducting and movable member deflectable by said means, and an electron discharge device provided with an oscillation circuit and with an output circuit: two inductive elements connected in said oscillation circuit, one having a portion in mutually inductive relationship to the other element and associated therewith in a sense to degenerate oscillatory action in said oscillation circuit, the said movable member being deflectable in the field between the related element and element portion for inhibiting the degenerative action therebetween to vary thereby the oscillatory condition of said oscillation circuit.

10. In a system for control of a variable condition to a predetermined value, and including means subject to the condition under control, an electrically conducting and movable member deflectable by said means, an electron discharge device having an input circuit and an output circuit and each including resonant portions whereby they may be tuned to a common oscillatory frequency: two mutually inductive and resonant portions connected in said output circuit and associated in a sense to degenerate oscillatory action therein, said movable member being deflectable in the field between said mutually inductive portions for inhibiting the degenerative action therebetween to vary thereby the oscillatory condition of said output circuit.

11. In a system for control of a variable condition to a predetermined value, and including means subject to the condition under control, an electrically conducting and movable member deflectable by said means, and an electron discharge device provided with an oscillation circuit and with an output circuit: a pair of juxtaposed electromagnetic windings connected in said oscillation circuit and means to maintain the same at substantially the same electrical potential, said winding being associated in a sense to degenerate oscillatory action therein, and said movable member being deflectable in the field between said windings to vary thereby the oscillatory condition of the said oscillation circuit.

12. In a system for control of a variable condition to a predetermined value, and including means subject to the condition under control, and an electrically conducting and movable member deflectable by said means: the combination with an electron discharge device provided with an output circuit and with an oscillation circuit including two mutually inductive portions associated in a sense to degenerate oscillatory action in said oscillation circuit and affording a common field therebetween, said movable member being deflectable therein for inhibiting the degenerative action of said mutually inductive portions, thereby varying the oscillatory condition of said oscillation circuit; of an electronic protective circuit having an electron discharge device provided with an oscillation circuit, means operative upon failure of the means subject to the condition under control for interrupting the oscillatory circuit of said second electron discharge device, and means responsive then to the said output circuit of the first electron discharge device to control the variable condition.

13. In a system for control of a variable condition: an oscillation circuit with thermionic tube, and input and output coils, the output coil being constituted of two portions one of which is juxtaposed to the input coil in a sense to degenerate oscillatory action in said oscillation circuit and the other portion being located in the circuit at a point remote therefrom, and a vane adapted for introduction, by the condition under control, between the said juxtaposed coils.

14. In a system for control of a variable condition: an oscillation circuit with thermionic tube, and input and output coils juxtaposed in a sense to degenerate oscillatory action in said oscillation circuit, and a vane adapted for introduction, by the condition under control, between said juxtaposed coils.

15. In a system for control of a variable condition: an oscillation circuit with thermionic tube having input and output elements, an input coil connected between said input elements, an output coil connected between said output elements, said coils being juxtaposed and coupled, means for applying to one of the coils a positive potential with respect to the other coil, a conducting vane and means subject to the condition under control for introducing the same between the said input and output coils, together with means to apply to the vane a predetermined potential with respect to said other coil approximately midway the potential difference between the two coils for maintaining an electrostatic balance between said vane and said coils.

16. In a system for control of a variable condition: an oscillation circuit comprising a thermionic tube having input and output elements, an input coil coupled between said input elements, an output coil coupled between said output elements, the output coil being constituted of two portions, one of which is juxtaposed and coupled to the input coil, and a conducting vane and means subject to the condition under control for introducing the same between the said juxtaposed coils, the other coil portion being located in the circuit at a point remote from the input coil to diminish the electromagnetic reaction of the output coil on the vane.

17. In a system for control of a variable condition: an oscillation circuit comprising a thermionic tube, having input and output elements, an input coil coupled between said input elements, an output coil coupled between said output elements, said coils being juxtaposed in a sense to degenerate oscillatory action in said oscillation circuit, the output coil being constituted of two portions one of which is juxtaposed and coupled to the input coil and electrically connected thereto and the other portion being located in the circuit at a point remote therefrom, and a conducting vane and means subject to the condition under control for introducing the same between the said juxtaposed coils.

FRED B. MacLAREN, Jr.

DISCLAIMER 2,234,184.—*Fred B. MacLaren, Jr.*, Waterbury, Conn. ELECTRONIC CONTROL SYSTEM. Patent dated March 11, 1941. Disclaimer filed November 13, 1942, by the assignee, *The Bristol Company*.

Hereby enters this disclaimer to claim 4 of said patent.

[*Official Gazette December 8, 1942.*]